3,412,171
PURIFICATION OF HYDROCARBONS
Lester M. Welch, Seabrook, and Lloyd D. Tschopp and Rudolph C. Woerner, Houston, Tex., assignors to Petro-Tex Chemical Corporation, Houston, Tex., a corporation of Delaware
Filed June 27, 1966, Ser. No. 560,639
5 Claims. (Cl. 260—681.5)

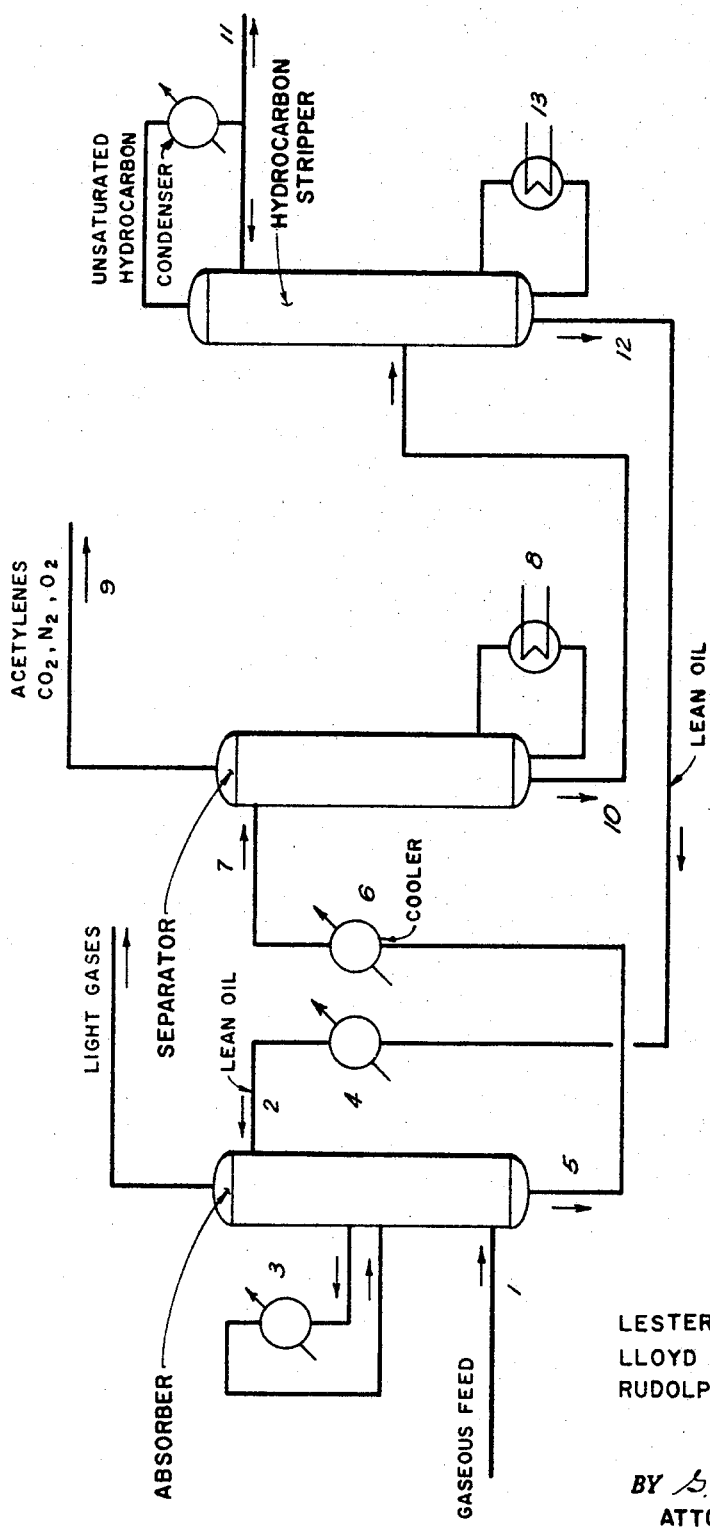

ABSTRACT OF THE DISCLOSURE

A process for the purification of unsaturated hydrocarbons, particularly diolefins such as butadine-1,3 or isoprene from a gaseous mixture containing hydrocarbons including acetylenic hydrocarbons and relatively noncondensable gases including oxygen. Gases to be purified may be obtained by oxidative dehydrogenation. Purification by a particular process including the use of benzene or toluene as an absorber oil.

Unsaturated hydrocarbons such as styrene, butene and butadiene are commercially produced by the catalytic dehydrogenation of more saturated hydrocarbons. Butadiene is produced in large quantities by the dehydrogenation of butane and butene. Improved processes whereby higher conversions, yields and selectivities of products are desired. Additional improvements in the processes are also desired.

Improved processes for the preparation of unsaturated hydrocarbons such as butenes, butadiene-1,3, isoprene or styrene are processes whereby hydrocarbons such as butane, butene, isopentene, isopentane or ethylbenzene are dehydrogenated at elevated temperatures in the presence of catalysts, oxygen, and suitably halogen. Superior results and yields of products are thereby obtained. However, the product streams contain not only the desired unsaturated hydrocarbons but also may contain various by-products such as CO, $CO_2$, hydrogen, nitrogen, oxygen, oxygenated hydrocarbons, acetylenic compounds, unreacted hydrocarbons, etc. When air is used as a source of oxygen, the effluent from the dehydrogenation reactor will contain large quantities of certain relatively non-condensable gases, such as nitrogen. The gaseous effluent will also contain varying amounts of steam.

Various problems exist in regard to the economic separation and purification of unsaturated hydrocarbons produced by oxidative dehydrogenation which are not encountered in the recovery of products produced by dehydrogenation in the absence of oxygen. Consequently, techniques utilized for the recovery and purification of products derived from the dehydrogenations in the absence of oxygen have not generally been found satisfactory for the recovery of effluents resulting from oxidative dehydrogenation reactions. The presence of large quantities of oxygen, by-products gases, and gases such as nitrogen create entirely different problems from those previously encountered. One particular problem encountered is the problem in regard to the removal of acyclic acetylenic compounds, e.g. when the desired product is a mono-olefin or a diolefin. Many unsaturated hydrocarbon products, such as butadiene-1,3, have rather strict maximum requirements of acetylenic compounds. The quantity of acetylenic compound should desirably be reduced to a relatively minor mol percent of the hydrocarbon product. Furthermore, another problem encountered in the recovery of effluents from oxidative dehydrogenation reactors is that a high degree of fouling of recovery equipment is encountered. In view of these and other problems, a process was needed which would recover and purify the unsaturated hydrocarbon in an economical and efficient manner.

According to this invention, a process has been discovered whereby the unsaturated product may be recovered from the various gases present and from the acetylenic compounds at the same time. According to this invention, a particular gaseous mixture comprising unsaturated hydrocarbons, oxygen and inert non-condensable gases may be separated by intimately contacting the gaseous mixture with a composition comprising benzene, toluene or mixtures thereof. The contacting zone is preferably maintained at a temperature of between 55° F. and 150° F. and a pressure between 100 p.s.i.g and 200 p.s.i.g. The liquid composition from the contacting zone is then separated, such as by stripping, to recover the unsaturated hydrocarbons.

The zone wherein the gaseous mixture is contacted with the benzene, toluene or mixtures thereof, may be any suitable equipment for absorbing the gaseous mixture in the composition. This absorber may be e.g. a column having bubble cap trays or perforated plates or may be a packed column or the like. The zone wherein the unsaturated hydrocarbon is stripped from the resulting liquid composition may be any equipment to perform this function. One method for stripping off the unsaturated hydrocarbons is to feed the composition to the top or near the top of a fractionating column such as a tray type or packed column. Although less perferred it is also possible to flash off the gases in equipment so designed. Preferred equipment for the stripping zones are plate columns (perforated, value, bubble cap, etc.) and packed columns. Also it is preferred to feed the composition to the top ⅓ of the stripping column.

The gaseous mixture to be treated containing the unsaturated hydrocarbon, non-condensable gases, oxygen, by-product acetylenes and various other by-products may be obtained from a variety of sources. However, the invention is particularly suitable for the purification of gaseous effluents resulting from the oxidative dehydrogenation of hydrocarbons utilizing air or oxygen diluted with non-condensable diluents such as nitrogen or helium. Halogens may be added to increase the yields and selectivities of the desired product. A preferred source of halogen is from ammonium halides as disclosed in U.S. 3,207,805. Examples of processes for dehydrogenation in the presence of oxygen are found in U.S. Patents 3,207,805 through U.S. 3,207,811, also e.g. in Examples I of U.S. 3,159,688, U.S. 3,205,280 and according to U.S. 3,080,435 wherein a molten salt reactor containing a metallic iodide is employed.

Hydrocarbons to be dehydrogenated are acyclic, cycloaliphatic or alkyl aryl hydrocarbons of 3 to 9 carbon atoms, which contain at least two adjacent carbon atoms, each of which carbon atom has at least one hydrogen atom attached. The dehydrogenation will produce compounds having double and/or triple bonds. Thus, butadiene-1,3 and/or vinylacetylene may be produced from butene-1 or butene-2 or mixtures thereof, and isoprene may be produced from any of the methyl butenes, such as 2-methyl butene-1, 2-methyl butene-2 or 3-methyl butene-1 or mixtures thereof. Isoprene may also be produced from methyl butanes, such as 2-methyl butane; also olefins and diolefins may be produced from saturated hydrocarbons, for example, vinyl acetylene, butadiene and butene may be produced from n-butane. A mixture of mono-olefins and diolefins may also be produced, such as a mixture of butadiene-1,3 and butenes from a feedstock of a mixture of n-butane and butene. Cyclohexane may be dehydrogenated to cyclohexene and/or benzene. Ethyl benzene or ethylcyclohexane may be dehydrogenated to styrene.

Good results have been obtained with a feed containing at least 50, and preferably at least 75, mol percent of an acyclic aliphatic hydrocarbon, such as the hydrocarbons of 4 to 5 carbon atoms having a straight chain of at least four carbon atoms and single double bond; preferred are the monoethylenically unsaturated compounds or mixtures of saturated and unsaturated compounds.

Oxygen will generally be supplied to the dehydrogenation zone in the range of about 0.20 mol of oxygen to 2.0 or 3.0 mols of oxygen per mol of hydrocarbon to be dehydrogenated. A preferred range for the oxygen is from about 0.3 to 1.50 mols of oxygen per mol of hydrocarbon to be dehydrogenated. Either air or oxygen diluted with diluent such as nitrogen, helium and the like may be utilized. Steam may be fed to the dehydrogenation zone in amounts such as from about 2 to 40 mols of steam per mol of hydrocarbon to be dehydrogenated. An advantageous range is from 2 to 20 mols of steam per mol of hydrocarbon. If halogen is employed, the halogen will suitably be present in an amount from about .001 to 0.1 mol per mol of hydrocarbon fed.

The dehydrogenation reaction may be conducted in the absence of contact catalysts, but better results are obtained if the reaction is conducted in the presence of metal or metal compound catalysts. The dehydrogenation reactor may be a fixed or fluid bed reactor. Reactors such as those conventionally used for the dehydrogenation of hydrocarbons to butadiene may be employed. The total pressure in the dehydrogenation zone may suitably be about atmospheric pressure. However, higher pressures or vacuum may be used. Pressures such as from about atmospheric (or below) up to about 100 to 200 p.s.i.g. may be employed. The dehydrogenation reaction will normally be conducted at a temperature of reaction between about 600° F. to about 1500° F. or higher although generally the maximum temperature in the reactor will be within the range of about 700° F. and 1300° F. This temperature of the reaction is measured at the maximum temperature in the reactor. The flow rates of the reactants may be varied quite widely and will be dependent somewhat on whether fixed or fluid bed reactor is employed. Good results have been obtained with flow rates of the hydrocarbon to be dehydrogenated ranging from about ¼ to 25 liquid volumes of hydrocarbon to be dehydrogenated per volume of reactor zone per hour, with the volumes of hydrocarbon being calculated as the equivalent amount of liquid hydrocarbons at standard conditions of 15.6° C. and 760 millimeters of mercury absolute. For the purpose of calculating flows, the reaction zone is defined as the portion of the reactor which contains catalyst and which is at a temperature of at least 600° F. In other words, the volume of the reaction zone is equivalent to the volume of the catalyst zone if it were empty. The residence or contact time of the reactants in the dehydrogenation zone depends on several factors involved in the reaction. Contact times such as about 0.001 to about 5, 10 or 25 seconds have been found to give excellent results. Under certain conditions, higher contact times may be utilized. Contact time is the calculated dwell time of the reaction mixture in the reaction zone assuming the mols of product mixture are equivalent to the mols of feed.

The effluent from the dehydrogenation zone will contain the impure unsaturated hydrocarbon products, oxygen, various impurities including oxygenated hydrocarbons, non-condensable inert gases and depending upon the particular process, perhaps some unconverted feed or halogenated compounds. If air was used as the source of oxygen, nitrogen will be present in relatively large quantities as a non-condensable gas. Steam may be present in an amount up to 96 mol percent of the total effluent, such as from about 5 to 96 mol percent. The organic phase including dehydrogenated product, any unreacted feed, oxygenated hydrocarbons, any halogenated compounds, polymer and tar and precursors thereof and any organic decomposition products usually range from about 3 to 50 mol percent of the effluent and generally will be within the range of about 3 to 30 or 35 mol percent of the effluent. The non-condensable gases (under the conditions encountered), such as nitrogen, will be present in an amount of from or about 20 to 93 mol percent of the total effluent.

The effluent gases leaving the dehydrogenation zone will generally be at temperature of about or greater than 600° F. or 700° F. to 1600° F. depending upon the particular dehydrogenation process. The effluent gases are then cooled prior to further treatment according to this invention. The reactor effluent may be cooled by any means or combination of means as by quenching followed by employing waste heat boilers, condensers, vapor separators and the like. Ordinarily, water will be removed as condensed steam from the gaseous effluent during this cooling operation. This cooled gaseous stream may then be treated according to the present invention or may first be processed to remove carbonyl compounds or halogenated compounds such as by the process of U.S. 3,200,166.

A preferred embodiment of the invention is illustrated in the drawing. According to the process of the drawing, a separator is employed in addition to the absorber and the hydrocarbon stripper. This sequence together with the process conditions is claimed in copending application Ser. No. 560,638 filed on even date herewith. The gas feed 1 may be obtained from any suitable source, such as from the dehydrogenation of hydrocarbons in the presence of oxygen to form a mixture of inert non-condensable gases, unsaturated hydrocarbons, unreacted hydrocarbons, oxygenated hydrocarbons, acetylenes, oxygen, nitrogen, water and various other by-products, such as $CO_2$ and CO. The dehydrogenation reactor effluent generally will be cooled such as by quenching and by indirect heat exchange prior to entering the absorber. Also, some of the steam may be removed by means such as knockout vessels and the like. Any halogens or halogen compounds will preferably be removed upstream. The gaseous feed 1 will comprise or consist, exclusive of any water present, from 3.5 to 80 mol percent unsaturated hydrocarbon, from .001 to 3 mol percent oxygen, from 20 to 93 mol percent inert non-condensable gases (this term refers to non-hydrocarbons such as $H_2$, $N_2$, $CO_2$, CO, helium, and the like which are not condensable under the conditions encountered). The gaseous feed 1 may also optionally contain from 0.003 to 7 mols of water, either as steam or as entrained water, per mol of total hydrocarbon. Based on the total organic content of the gaseous feed 1, the total hydrocarbons will constitute at least 85 mol percent of the organic portion of this gaseous feed 1. Preferably, the composition of the gaseous feed 1, exclusive of any water present, will be from 5 to 65 mol percent unsaturated hydrocarbons, from .001 or .01 to 1.0 (preferably less than 0.3) mol percent oxygen, from 45 to 89 mol percent inert non-condensable gases, and the total hydrocarbons will constitute at least 95 mol percent of the organic portion of the gaseous feed 1. Also, preferably, water will be present as steam in an amount of from 0.003 to 10 mols of steam per mol of total hydrocarbon in the gaseous feed.

Lean oil 2 comprises benzene, toluene or mixtures thereof and will preferably be fed to the top of the absorber in order to have countercurrent contact with the gaseous feed 1 which is rising in the tower. The lean oil will predominately consist of benzene or toluene or mixtures thereof. Of course, the lean oil may contain impurities, particularly after the process has been in operation for a period of time.

The absorber is suitably operated within a temperature of from 60° F. to 150° F. and, more desirably, within the range of 80° F. to 135° F. The pressure in the absorber will be from 100 p.s.i.g. to 200 p.s.i.g. and, more desirably, from 120 ps.i.g. to 140 p.s.i.g. According to this preferred embodiment, the absorber does not contain a reboiler. That is, the absorber is not a fractionating absorber.

During operation of the process, some impurities will be encountered in the recycling lean oil. Nevertheless, the lean oil 2 entering the top of the absorber should have a composition containing predominately, and preferably, at least 65 mol percent of benzene, toluene or mixtures thereof. Means may be provided to purify the lean oil to remove heavier materials, such as by distillation, prior to recirculating the lean oil to the absorber.

Suitably, coolers such as 3 and 4 may be inserted into the absorber system in order to maintain the required reaction conditions in the absorber. Also, not shown, the absorber may have incorporated a sponge oil unit to recover lean oil going overhead from the absorber. This lean oil coming overhead may be purified, such as by absorption and stripping in the sponge oil unit and returned to the lean oil system at any point.

The liquid composition 5 leaving the absorber comprises the fat oil containing absorbed gases. This composition may then be cooled in cooler 6. Any suitable means for cooling this composition may be utilized, such as a heat exchanger cooled by refrigerant or cooled water.

The cooled composition 7 is then fed to the separator. The composition 7 is preferably fed to the upper one-third of the separator, and, preferably, is fed to the top tray of the separator. Heat is added to the separator, such as by a reboiler 8. In the separator, the large quantities of inert non-condensable gases including oxygen, nitrogen, $CO_2$, and various $C_2$'s and $C_3$'s, may be taken off overhead together with acetylene compounds. Exclusive of any water present, in the separator, preferably at least 1 mole percent of the stream 7 is removed as an overhead gaseous composition 9. The gaseous overhead 9 from the separator may then be disposed of in any manner. The gaseous composition 9 may be returned to the inlet for the compressors compressing the reactor effluent or may be fed to separate compressors and thereafter may be recycled to the gaseous feed 1 entering the absorber. The gaseous overhead 9 may also be cooled and collected in an accumulator (not shown) from which the composition is recycled to the separator and the gaseous overhead from the accumulator may then be sent to a compressor and thereafter fed to the gaseous feed line 1 or utilized otherwise. According to this scheme, excellent removal of acetylenic compounds is achieved. The liquid composition 10 is fed to the hydrocarbon stripper wherein the unsaturated hydrocarbon is stripped from the lean oil and taken off overhead as 11. The lean oil 12 is taken off from the stripper and may be purified by means not shown prior to returning to the absorber as 2. The hydrocarbon stripper will have means for heating, such as by the reboiler 13. The unsaturated hydrocarbon 11 coming overhead may then be sent for further purification, for example, to separate the unsaturated hydrocarbon from the remaining hydrocarbons.

The separator may suitably be operated at a temperature of between about 55° F. and 190° F. and a pressure of between about −5 p.s.i.g. and 70 p.s.i.g., with the preferred temperature range being from 70° F. to 160° F. and the preferred pressure range being between 15 p.s.i.g. and 50 p.s.i.g.

The invention will be illustrated for the purification of butadiene-1,3. Butadiene is obtained by oxidative dehydrogenation. The effluent from the reactor is cooled and steam is removed through knock-out vessels. The resulting gaseous stream is then processed according to this invention, with reference being made to the drawing. The gaseous feed 1 contains 18 mol percent butadiene, 12 mol percent total butene and butane, 0.1 mol percent oxygen, 69.9 mol percent inert noncondensable gases (including $H_2$, $N_2$, $CO_2$, CO and helium). The gaseous feed 1 also contains 0.6 mols of water per 100 moles feed.

Lean oil 2 is fed to the top of the absorber and the gaseous feed 1 is fed to the bottom of the absorber. The lean oil 2 is benzene with a boiling point of 176° F.

The absorber is operated with a bottoms temperature of about 130° F. in an overhead temperature of 70° F. The pressure in the absorber is about 125 p.s.i.g. The absorber does not contain a reboiler. The absorber is equipped with a sponge oil unit to recover lean oil going overhead from the absorber.

The liquid composition 5 leaving the absorber comprises the fat oil containing absorbed gases. This composition is cooled in cooler 6 and is transmitted to the top of the separator. Heat is added to the separator by reboiler 8. The separator is operated at a bottoms temperature of 130° F. and an overhead temperature of about 85° F. In the separator, methylacetylene, together with large quantities of inert, noncondensable gases are taken off overhead. In the separator 3.0 mol percent of the stream is removed as an overhead gaseous composition 9. The liquid composition 10 is fed to the hydrocarbon stripper wherein unsaturated hydrocarbons are stripped from the lean oil and taken off overhead as 11. The hydrocarbon stripper bottoms temperature is about 250° F. The lean oil 12 is purified by means not shown and returned to the absorber as lean oil 2. The unsaturated hydrocarbon 11 coming overhead from the hydrocarbon stripper is then further purified to produce butadiene-1,3 of a composition of at least 99.1 mole percent purity wherein the methylacetylene is present in an amount of less than 0.01 mol percent.

When this example is repeated utilizing a gaseous stream 1 wherein the major hydrocarbon component is isoprene instead of butadiene-1,3 the advantages of the invention are also realized.

We claim:
1. A process for the preparation of unsaturated hydrocarbons comprising a member selected from the group consisting of butadiene-1,3, isoprene or mixtures thereof without the formation of excessive polymer which comprises
   (1) oxidatively dehydrogenating hydrocarbons containing at least 50 mol percent acyclic aliphatic hydrocarbons of 4 to 5 carbon atoms having a straight chain of at least four carbon atoms with said hydrocarbons of 4 to 5 carbon atoms having at least two adjacent carbon atoms each of which has at least one carbon atom attached to produce a gaseous mixture comprising exclusive of any water present from 3.5 to 80 mol percent unsaturated hydrocarbons including the said butadiene-1,3, isoprene or mixtures thereof, and from 20 to 93 mol percent inert non-condensable gases containing from .001 to 3 mol percent oxygen,
   (2) intimately contacting in an absorbing zone the said gaseous mixture with an oil consisting essentially of toluene,
   (3) taking off from the said absorbing zone a liquid composition comprising the said oil and dissolved hydrocarbons,
   (4) separating the said liquid composition of (3) by stripping with heat to remove dissolved hydrocarbons as a volatile fraction and to produce a lean oil containing dissolved therein material heavier than toluene,
   (5) removing the said heavier materials from (4) by distillation from the toluene,
   (6) feeding the purified oil consisting essentially of toluene from (5) to the said absorbing zone of (2) as absorber oil.

2. A process for the preparation of butadine-1,3 without the formation of excesive polymer which comprises
   (1) oxidatively dehydrogenating hydrocarbons containing at least 50 mol percent butene to produce a gaseous mixture comprising exclusive of any water present from 3.5 to 80 mol percent unsaturated hydrocarbons, and from 20 to 93 mol percent inert noncondensable gases including oxygen in an amount of from .001 to 1.0 mol percent oxygen, (2) intimately contacting in an absorbing column the said gaseous mixture with an oil consisting essentially of toluene, the said absorbing column being operated within the range of 80° F. to 135° F. and at a pressure of from 100 p.s.i.g. to 200 p.s.i.g., (3) taking off from the said absorbing zone a liquid composition comprising the said toluene and dissolved hydrocarbons, (4) separating the said liquid composition of (3) by feeding the liquid composition to the top one-third of a stripping column and stripping with heat to remove dissolved hydrocarbons as a volatile fraction and to produce a lean oil containing dissolved therein material heavier than toluene, (5) removing the said heavier materials from (4) by distillation and taking off toluene in a volatile fraction, (6) condensing toluene from (5) and feeding condensed toluene to the said absorbing zone of (2) as absorber oil.

3. A process for the preparation of butadiene-1,3 containing less than 0.01 mol percent methyl acetylene without the formation of excessive polymer which comprises (1) oxidatively dehydrogenating hydrocarbons containing at least 50 mol percent butene to produce a gaseous mixture comprising exclusive of any water present from 3.5 to 80 mol percent unsaturated hydrocarbons including butadiene-1,3 and a minor amount of methyl acetylene, and from 20 to 93 mol percent inert noncondensable gases containing oxygen in an amount of less than 0.3 mol percent oxygen, (2) intimately contacting the said gaseous mixture in an absorbing column with an oil consisting essentially of toluene, the said absorbing column being maintained at a temperature of between about 60° F. and 150° F. and a pressure of between 100 p.s.i.g. and 200 p.s.i.g., (3) taking off from said absorbing column a liquid composition containing the said toluene and butadiene-1,3 absorbed therein, (4) cooling the said liquid composition of (3) to a temperature of no greater than 100° F., (5) feeding the cooled product from (4) to a column which is maintained at a temperature of between 55° F. and 190° F. and a pressure between −5 p.s.i.g. and 70 p.s.i.g., (6) heating the said column of (5) to take off a gaseous mixture comprising oxygen, inert noncondensable gases and methyl acetylene, (7) taking off from the said column of (5) a liquid composition comprising the said toluene and butadiene-1,3 dissolved therein, (8) separating the said liquid composition of (7) by stripping with heat to remove dissolved butadiene-1,3 as a volatile fraction and to produce a lean toluene containing dissolved therein material heavier than toluene, (9) removing the said heavier materials from (8) by distillation and taking off toluene in a volatile fraction,

(10) condensing toluene from (9) and returning condensed toluene to the said absorbing column of (2) as absorber oil.

4. The method of claim 1 wherein the said unsaturated hydrocarbon is butadiene-1,3.

5. The method of claim 1 wherein the said absorbing in step (2) is conducted at a temperature within the range of 80° F. to 135° F. and at a pressure of from 100 p.s.i.g. to 200 p.s.i.g.

References Cited

UNITED STATES PATENTS

| 2,573,341 | 10/1951 | Kniel | 260—677 |
| 2,814,359 | 11/1957 | Koble | 255—51 |
| 2,905,732 | 9/1959 | Fauske | 55—51 |
| 2,909,579 | 10/1959 | Schmidt et al. | 260—677 |
| 3,023,843 | 3/1962 | Grubb et al. | 55—64 |
| 3,235,471 | 2/1966 | Clay | 260—681.5 |

FOREIGN PATENTS 956,048  4/1964  Great Britain.

DELBERT E. GANTZ, *Primary Examiner.*

HERBERT LEVINE, *Assistant Examiner.*